(No Model.) 2 Sheets—Sheet 1.

P. P. NUNGESSER.
MAGNETO ELECTRIC MACHINE.

No. 287,773. Patented Oct. 30, 1883.

Attest
Walter D. Malarin
F. L. Middleton

Inventor
Philip P. Nungesser
by Joyce & Spear
Attys (No Model.)

P. P. NUNGESSER.
MAGNETO ELECTRIC MACHINE.

No. 287,773.

2 Sheets—Sheet 2.

Patented Oct. 30, 1883.

Attest:
Walter Donaldson
F. L. Middleton

Inventor.
Philip P. Nungesser
by Joyce & Spear
Attys

UNITED STATES PATENT OFFICE.

PHILIP P. NUNGESSER, OF CLEVELAND, OHIO.

MAGNETO-ELECTRIC MACHINE.

SPECIFICATION forming part of Letters Patent No. 287,773, dated October 30, 1883.

Application filed October 10, 1883. (No model.)

*To all whom it may concern:*

Be it known that I, PHILIP P. NUNGESSER, of Cleveland, in the county of Cuyahoga and State of Ohio, have invented a new and useful Improvement in Magneto-Electric Machines; and I do hereby declare that the following is a full, clear, and exact description of the same.

My invention relates to dynamo or electro magnetic machine. The first part includes a special plan of winding the helices upon the armature in connection with the field-magnets arranged with their polar extensions of like polarity diametrically opposite. The second part more particularly concerns the construction of the core of the armature, and has for its object the better ventilation and to secure a greater amount of magnetic surface of said armature.

Figure 1:
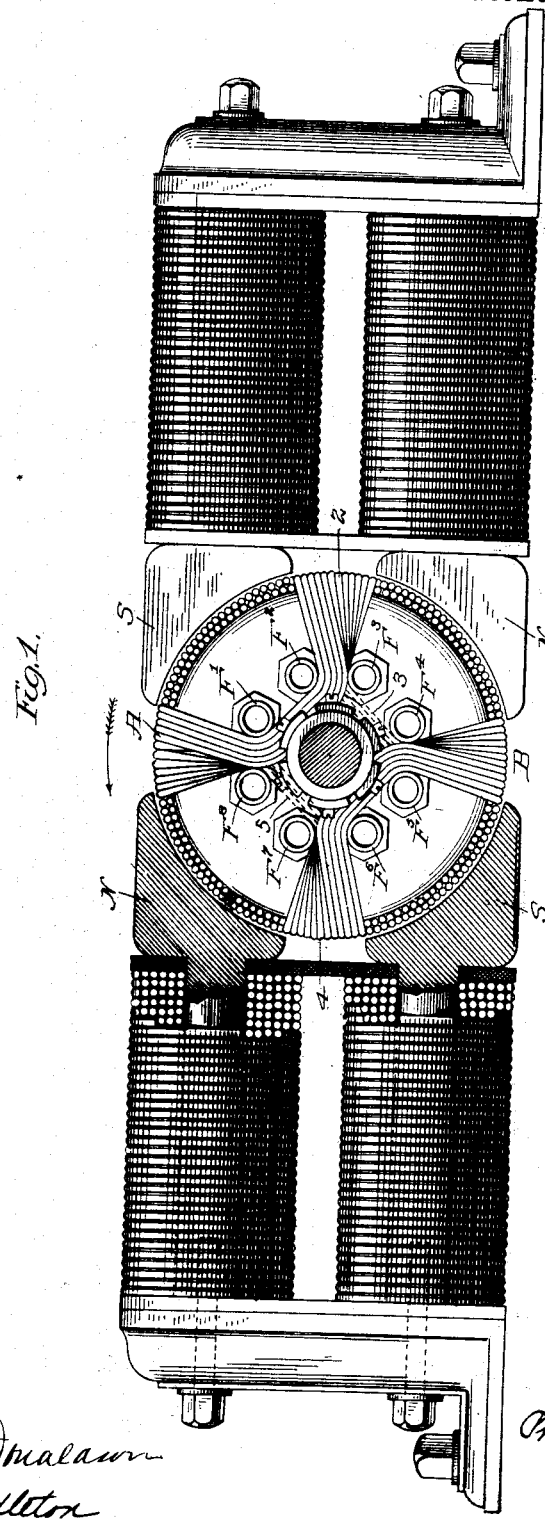
Figure 2:
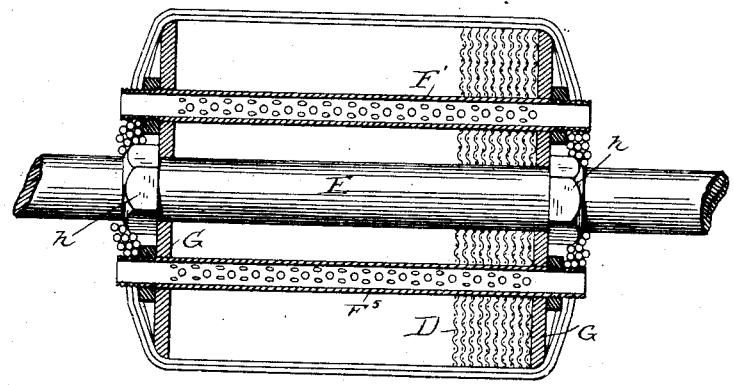
Figure 3:
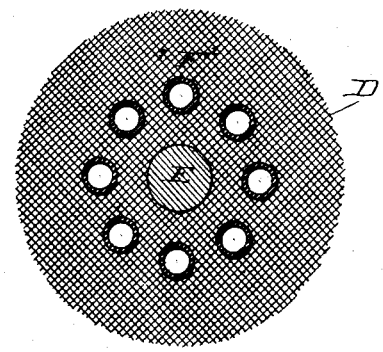

In the accompanying drawings, Figure 1 represents an end view of the armature, with the field-magnets partly in elevation and partly in section. Fig. 2 shows a longitudinal section of the armature. Fig. 3 shows a disk of the core of the armature, with the axis and tubes in end view.

The field-magnets are two in number, and may be of any ordinary construction. Their poles are preferably made in the shape shown in Fig. 1, and extend in width across the entire length of the armature. They are marked, respectively, N and S, to indicate the north and south poles. Like poles are diametrically opposite each other, so that adjacent poles are of opposite polarity. The manner of winding the armature is shown in Fig. 1. I describe a pair of helices, A and B, as an illustration of the whole. Helix A is wound on the periphery in lines parallel with the axis, and at the end the wire is carried toward the axis and around the projecting tube F', hereinafter fully described. Thence it is carried around F², and at right angles to its line of approach to the axis is brought to the periphery at 2, and thence longitudinally on the periphery to the other end of the armature, where it is wound toward the axis around the opposite end of tubes F³ and F⁴, as shown in dotted lines at 3, out to the periphery on a line with B and diametrically opposite A. Thence it is brought on this line to the end of the armature next to the observer, and wound across the end about F⁵ and F⁶ to the periphery again at 4, along which it is carried to the opposite end, where it is bent toward the axis and carried around the opposite ends of F⁷ and F⁸, as shown in dotted lines 5, and thence to A—the starting-point. This forms a complete helix, and the ends, after sufficient windings in the manner described, are connected with the commutator or otherwise. This forms one long helix, which is under the influence of four poles at the same time. The other helices are wound in the same manner until the armature is completed. Each helix is what may be called a "double helix," formed by winding the coils twice around the core.

The commutators are not shown, as they may be of any ordinary construction.

The core or body of the armature is composed of disks of wire-cloth, such as that represented at D, Fig. 3. It is composed of wire-cloth of any desired fineness, and may be cut from such cloth with the holes by one blow of a suitable die. These disks are slipped onto the shaft E and made to lie snugly together. The holes for the tubes (hereinafter described) are made at regular distances from the axis and from each other, so as to be accurately in line when the disks are all upon the axis. I prefer to partially turn each succeeding disk after the first as it is put on, so that the wires of continuous disks shall not run in precisely the same direction—that is to say, the wires of contiguous disks shall cross each other. The disks may be dipped in any suitable substance in order to magnetically insulate them after they are in place. The core thus formed obviously is full of interstices, and contains a large amount of magnetic surface throughout the mass or body. The structure also permits the passage of air freely and in every part, and the armature may thus be kept cool by means of a circulation of air forced through in any suitable way. In connection with this structure I have devised means for admitting currents of air to the interior of the core. This consists of a series of tubes, F F' F², &c., which are inserted through the holes in the wire-cloth disks from end to end. These tubes also pass through the non-magnetic plates G G at the ends of the armature, and project far enough to receive the air. Within the plates G the tubes are perforated throughout their length with fine holes thickly set, so as to discharge fine streams of air through the interstices of the cloth disks. I may use any suitable means for forcing the air into their tubes; but I prefer the disks shown in my application filed in the United States Patent Office on the 25th day of September, 1883. The axis or shaft may be threaded, and nuts $h$ $h$ may be used to press the disks together. Nuts may be also placed on the ends of the tubes, and these serve as bolts to hold the disks together. The projecting ends of the tubes serve to hold the coils of the helices in place.

I claim as my invention—

1. The combination of the ventilated armature with the double helices, or helices wound twice upon the core, as described, and field-magnets having like poles diametrically opposite, as set forth.

2. An armature-core composed of disks of wire-cloth, with suitable means, substantially as described, for introducing air to the interior of said core.

3. The combination of the perforated wire-cloth disks of an armature-core and the perforated tubes, all substantially as described.

In testimony whereof I have signed my name to this specification in the presence of two subscribing witnesses.

PHILIP P. NUNGESSER.

Witnesses:
F. L. MIDDLETON,
WALTER DONALDSON.